Figure 5:
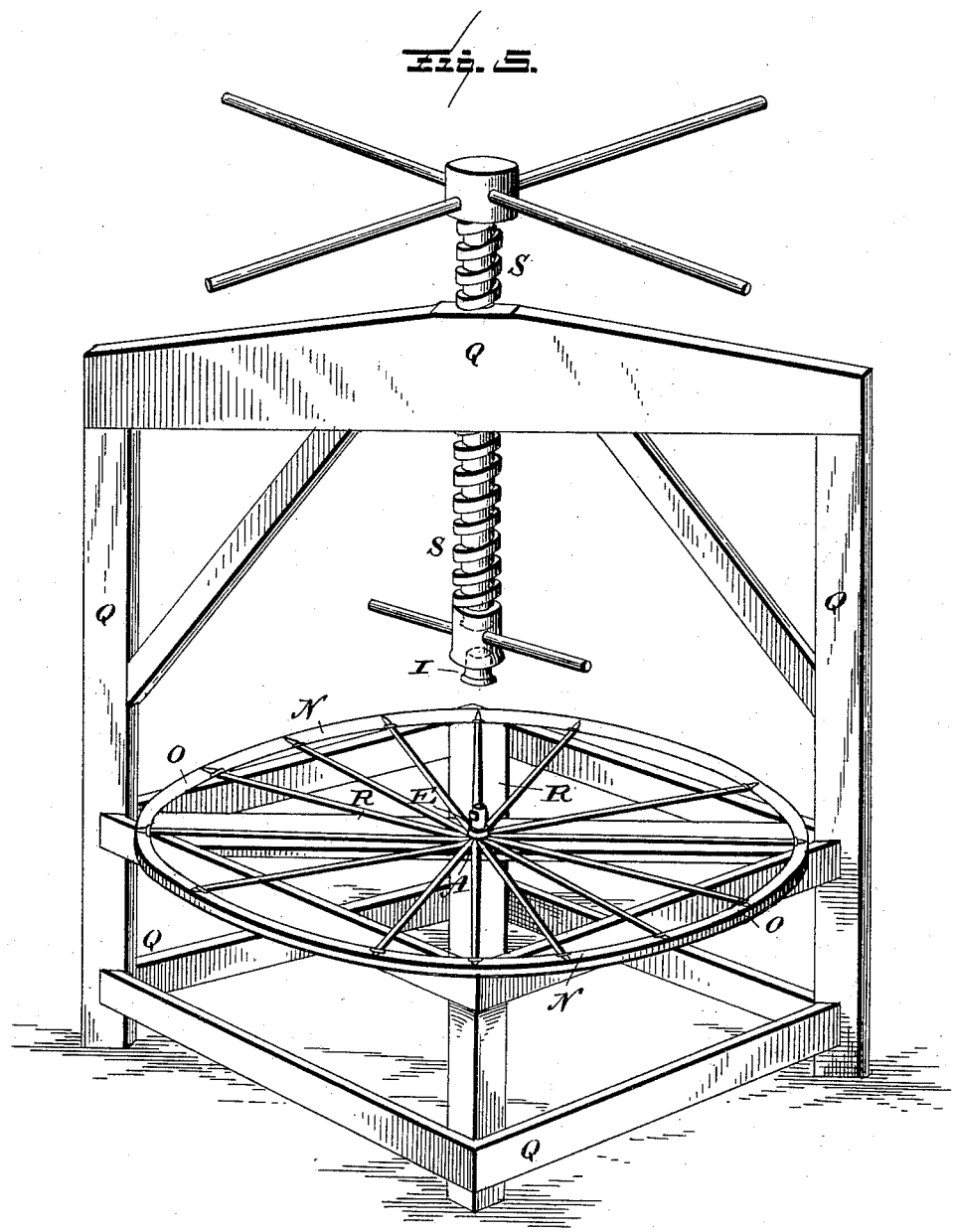

(No Model.) 2 Sheets—Sheet 1.
H. W. REABEN.
VEHICLE WHEEL.
No. 431,398. Patented July 1, 1890.
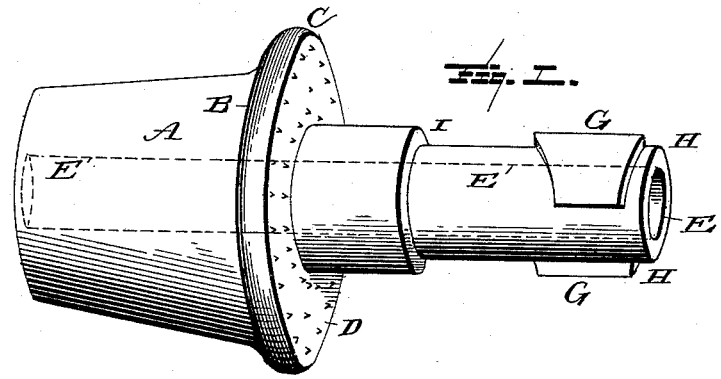
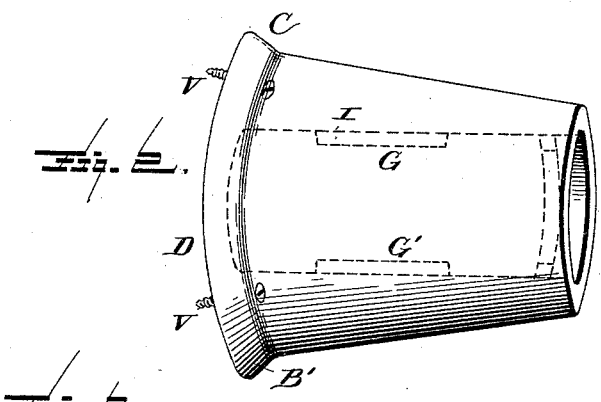
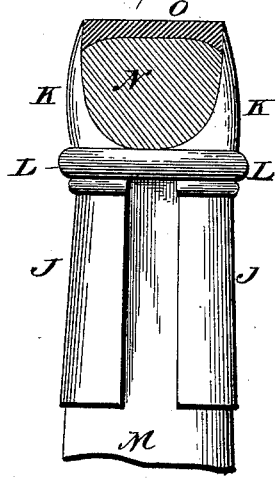
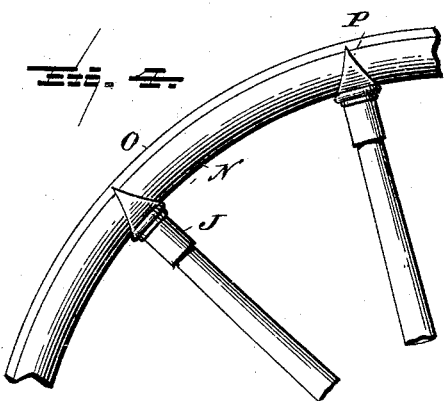
Witnesses
L. C. Hills.
E. H. Bond.
Inventor
Harris W. Reaben,
per Chas. H. Fowler
Attorney (No Model.) 2 Sheets—Sheet 2.

H. W. REABEN.
VEHICLE WHEEL.

No. 431,398. Patented July 1, 1890.

Witnesses
L. C. Hills.
E. A. Bond.

Inventor
Harris W. Reaben,
per Chas. H. Fowler
Attorney

UNITED STATES PATENT OFFICE.

HARRIS WALTER REABEN, OF SUMMIT, MISSISSIPPI.

VEHICLE-WHEEL.

SPECIFICATION forming part of Letters Patent No. 431,398, dated July 1, 1890.

Application filed March 21, 1890. Serial No. 344,855. (No model.)

*To all whom it may concern:*

Be it known that I, HARRIS WALTER REABEN, a citizen of the United States, residing at Summit, in the county of Pike, State of Mississippi, have invented a new and useful Cast-Iron Key-Hub and Wheel for Road Vehicles, of which the following is a specification.

My invention relates to improvements in cast-iron hubs and construction of wheels; and the object of the improvements are, first, to provide a substantial hub, and, second, to afford facilities for the rapid construction of the wheel. I attain these objects by the mechanism illustrated in the accompanying drawings, in which—

Figure 1 is a section of hub, showing inside half with box projecting. Fig. 2 is a side view showing outside half of the hub detached. Fig. 3 shows the spoke, felly, and tire-clamp applied end view. Fig. 4 shows the clamp as applied. Fig. 5 represents the wheel in a machine for construction.

Similar letters refer to similar parts throughout the several views.

The inside half of hub A has octagon surface B, with flange edge C and concave face D set with spurs, so as to allow two spurs to each spoke used. The projecting box E, cast as a part of inside half of hub A, is thickened at its base, forming a shoulder T, and with wards G G, having an inclined plane edge facing to center of hub, and an outside face H is formed near end of box E. Outside half of hub I has octagon surface B' and wards G' G', with inclined plane edges facing toward end of box E, and a ring that fits over and close to end of box E, so that the tap on end of spindle rests against the ring on end of outside half of hub I, which has flange edge C with convex surface that corresponds with concave surface D on section A, thus dishing the wheel as desired.

Clamp J (see Fig. 3) has corrugated jaws K hinging on ring L, so that when wedge-shape spoke M is pressed into clamp j it forces jaws K together, embedding corrugations into felly N, at the same time holding tire O.

P (see Fig. 4) represents side view of clamp as applied.

For constructing wheel, a machine Q, Fig. 5, is necessary. A cold tire o, with plano-concavo surface, (see Fig. 3,) is placed on bed R. Felly N, in two parts, with a convex surface corresponding to concave surface in tire O, is placed inside of tire, ends coming together, slightly raised, spokes adjusted in proper place, with wedge-shape circular ends resting against flange edge C of inside half of hub A. A slab of wood (or iron) is laid across wheel, the ends of which rest on ends of fellies. Force is applied by screw S, which adjusts fellies in proper place in tire. Releasing force, slab is removed. Outside half of hub I is placed into position on box E. Force is applied again with screw S, which has a cap-wrench with handle revolving on cone-journal on end of screw, bringing edge of wards G' G' against shoulder *f*, (see Fig. 1,) turning wrench to right until incline planes on wards G' G' come firmly together, forming a complete lock. Force is released; wheel is complete.

What I claim as new is—

1. The combination, with the part A, formed with inclined wards, projecting box, with shoulder T thereon, and concave face provided with spurs, of the outer part I, formed with concave face, substantially as specified.

2. The combination of the clamps J, having corrugated jaws K, spoke M, tire O, felly N, and encircling ring L, on which the jaws are hinged, substantially as shown and described.

HARRIS WALTER REABEN.

Witnesses:
JNO. TENNISSON,
CAREY DUNN.